(12) United States Patent
Doherty

(10) Patent No.: US 11,542,981 B2
(45) Date of Patent: Jan. 3, 2023

(54) SOCKET ASSEMBLY AND METHOD OF MAKING A SOCKET ASSEMBLY

(71) Applicant: Federal-Mogul Motorparts LLC, Southfield, MI (US)

(72) Inventor: Donald Richard Doherty, St. Peters, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 760 days.

(21) Appl. No.: 16/296,969

(22) Filed: Mar. 8, 2019

(65) Prior Publication Data
US 2020/0284291 A1    Sep. 10, 2020

(51) Int. Cl.
*F16C 11/06* (2006.01)

(52) U.S. Cl.
CPC ...... *F16C 11/0628* (2013.01); *F16C 11/0647* (2013.01); *F16C 11/0685* (2013.01); *B60G 2204/416* (2013.01); *Y10T 403/11* (2015.01)

(58) Field of Classification Search
CPC .............. F16C 11/0623; F16C 11/0628; F16C 11/0633; F16C 11/0638; F16C 11/0647; F16C 11/0652; F16C 11/0657; F16C 11/068; F16C 11/0685; Y10T 403/11; Y10T 403/32647; Y10T 403/32655; Y10T 403/32713; Y10T 403/32737; Y10T 403/32762; Y10T 403/32803; Y10T 403/32811
See application file for complete search history.

(56) References Cited

U.S. PATENT DOCUMENTS

| 2,417,160 A | 3/1947 | Graham |
| 2,953,401 A | 9/1960 | Moskovitz |
| 3,790,195 A | 2/1974 | Herbenar |

(Continued)

FOREIGN PATENT DOCUMENTS

| DE | 10204277 A1 * | 8/2003 | .......... F16C 11/0638 |
| DE | 10361289 A1 | 7/2005 | |

(Continued)

OTHER PUBLICATIONS

International Search Report, dated Jun. 30, 2020 (PCT/US2020/021638).

*Primary Examiner* — Josh Skroupa
*Assistant Examiner* — Kevin J Baynes
(74) *Attorney, Agent, or Firm* — Robert L. Stearns; Dickinson Wright, PLLC

(57) ABSTRACT

The assembly includes a housing that has an inner bore and a ball stud that has a ball portion with opposing first and second hemispheres. A bearing assembly is disposed in the inner bore of the housing and presents a curved first bearing surface that is in slidable contact with only the first hemisphere of the ball portion. The ball socket assembly also includes a curved second bearing surface that is presented on a different component from the bearing assembly and is in slidable contact with the second hemisphere of the ball portion. The bearing assembly has a plastic portion and a plurality of metal segments. The metal segments collectively define the first bearing surface and are fixedly attached with the plastic portion. The plastic portion allows the metal segments to individually move relative to one another to seat against the ball portion of the ball stud.

15 Claims, 5 Drawing Sheets

(56) References Cited

U.S. PATENT DOCUMENTS

| | | | | |
|---|---|---|---|---|
| 3,951,557 A | * | 4/1976 | Herbenar | F16C 11/0638 403/138 |
| 3,988,818 A | * | 11/1976 | Allison | F16C 11/0671 280/93.511 |
| 3,999,872 A | * | 12/1976 | Allison | B62D 7/16 403/135 |
| 4,028,784 A | * | 6/1977 | Allison | B62D 7/16 403/135 |
| 4,057,355 A | * | 11/1977 | Allison | F16C 11/0671 403/135 |
| 4,059,361 A | * | 11/1977 | Allison | B23P 11/00 403/138 |
| 4,231,673 A | * | 11/1980 | Satoh | F16C 11/0633 403/125 |
| 4,318,627 A | * | 3/1982 | Morin | F16C 11/0638 403/133 |
| 5,154,530 A | * | 10/1992 | Dresselhouse | F16C 11/0666 403/138 |
| 5,230,580 A | * | 7/1993 | Henkel | F16C 11/0614 403/135 |
| 5,286,131 A | | 2/1994 | Wood | |
| 5,549,700 A | | 8/1996 | Graham et al. | |
| 5,904,436 A | | 5/1999 | Maughan et al. | |
| 6,692,176 B1 | * | 2/2004 | Fladhammer | B60Q 1/06 403/122 |
| 7,040,833 B2 | * | 5/2006 | Kondoh | F16C 11/0638 403/135 |
| 7,144,182 B1 | * | 12/2006 | Jordan | F16C 11/0633 403/143 |
| 7,661,902 B2 | | 2/2010 | Brunneke | |
| 8,550,741 B2 | * | 10/2013 | Kuroda | F16C 11/0638 403/143 |
| 9,296,271 B2 | * | 3/2016 | Mevorach | F16C 11/0647 |
| 9,316,250 B2 | * | 4/2016 | Elterman | F16C 11/0604 |
| 2003/0180089 A1 | * | 9/2003 | Heuser | F16C 33/201 403/135 |
| 2014/0212204 A1 | | 7/2014 | Belleau et al. | |
| 2018/0252259 A1 | | 9/2018 | Englebright et al. | |
| 2019/0283515 A1 | * | 9/2019 | Paerewyck | B60G 3/20 |

FOREIGN PATENT DOCUMENTS

| | | | | |
|---|---|---|---|---|
| FR | 1556760 A | * | 2/1969 | F16C 11/0628 |
| FR | 2885188 A1 | * | 11/2006 | F16C 11/0638 |

* cited by examiner

SOCKET ASSEMBLY AND METHOD OF MAKING A SOCKET ASSEMBLY

BACKGROUND OF THE INVENTION

1. Field of the Invention

The present invention is related, generally, to socket assemblies, and more particularly, to socket assemblies for vehicle suspension and steering systems.

2. Related Art

Ball socket assemblies of the type that are used in vehicle suspension and steering systems typically include a ball stud which is movable relative to a housing. Such ball socket assemblies typically include one or more bearings that are positioned within the housing and are in sliding contact with a ball portion of the ball stud to facilitate the rotation of the ball stud relative to the housing. The bearings are typically made of either metal or a hard plastic material.

Ball socket assemblies with metal bearings typically have an improved durability and load bearing capacity as compared to plastic bearings. On the other hand, plastic bearings typically are less expensive to manufacture and offer improved tolerance compliance as compared to metal bearings.

SUMMARY OF THE INVENTION AND ADVANTAGES

One aspect of the present invention is related to a ball socket assembly. The assembly includes a housing that has an inner bore. The assembly also includes a ball stud that has a ball portion with opposing first and second hemispheres. A bearing assembly is disposed in the inner bore of the housing. The bearing assembly presents a curved first bearing surface that is in slidable contact with only the first hemisphere of the ball portion for allowing the ball stud and the housing to rotate and articulate relative to one another. The ball socket assembly also includes a curved second bearing surface that is presented on a different component from the bearing assembly and is in slidable contact with the second hemisphere of the ball portion. The bearing assembly has a plastic portion and a plurality of metal segments. The metal segments collectively define the first bearing surface and are fixedly attached with the plastic portion. The plastic portion allows the metal segments to individually move relative to one another to seat against the ball portion of the ball stud.

The segmented construction of the bearing surface allows for different portions of the bearing surface to individually seat against the ball portion of the ball stud, thereby improving surface-to-surface contact between the bearing assembly and the ball portion and improving force distribution between the ball stud and the bearing assembly. The metal construction of the bearing surface allows for increased durability and improved pull out strength, and the plastic portion allows for improved tolerance compliance.

According to another aspect of the present invention, the metal segments are not monolithically connected with one another.

According to yet another aspect of the present invention, the metal segments are monolithic with one another and are interconnected with one another via connectors that are flexible to allow the metal segments to move relative to one another.

According to still another aspect of the present invention, an inner surface of the housing defines the curved second bearing surface.

According to a further aspect of the present invention, the ball socket assembly further includes a preload member that is made of an elastically compressible material and that is elastically compressed to bias the curved first bearing surface of the backing bearing against the ball portion of the ball stud.

According to yet a further aspect of the present invention, the preload member is sandwiched between the plastic portion of the backing bearing and a cover plate.

According to still a further aspect of the present invention, the plurality of metal segments is further defined as four to eight metal segments.

Another aspect of the present invention is related to a ball socket assembly that includes a housing with an inner bore and a ball stud which has a ball portion. The ball socket assembly further includes a bearing assembly with a plastic portion and a plurality of metal segments. The metal segments are fixedly attached with the plastic portion and collectively define a curved bearing surface that is in slidable contact with the ball portion of the ball stud to allow the ball stud and housing to rotate and articulate relative to one another. The metal segments are spaced apart from one another and individually seat against the ball portion of the ball stud.

Yet another aspect of the present invention is related to a method of making a ball socket assembly. The method includes the step of fixedly attaching a plurality of metal segments, which collectively define a curved bearing surface, with a plastic portion to form a bearing assembly. The method continues with the step of inserting the bearing assembly as a pre-assembled unit into an inner bore of a housing. Separate from the step of inserting the bearing assembly into the inner bore of the housing, the method proceeds with the steps of inserting a ball portion of a ball stud into the inner bore of the housing and establishing slidable contact between the ball portion and the curved bearing surface of the bearing assembly. In response to establishing slidable contact between the ball portion of the ball stud and the curved bearing surface of the bearing assembly, moving at least one of the metal segments relative to the other metal segments to individually seat the at least one metal segment against the ball portion of the ball stud.

According to another aspect of the present invention, the method further includes the step of inserting a preload member into the inner bore of the housing.

According to yet another aspect of the present invention, the method further includes the step of elastically compressing the preload member.

According to still another aspect of the present invention, the metal segments are initially monolithic with one another and are interconnected with one another via a plurality of connectors.

According to a further aspect of the present invention, the method further includes the step of breaking the connectors to allow the metal segments to move relative to one another.

According to yet a further aspect of the present invention, the method further includes the step of stretching the connectors to allow the metal segments to move relative to one another.

BRIEF DESCRIPTION OF THE DRAWINGS

These and other features and advantages of the present invention will be readily appreciated, as the same becomes understood by reference to the following detailed description when considered in connection with the accompanying drawings wherein.

DETAILED DESCRIPTION OF THE ENABLING EMBODIMENT

Figure 1:
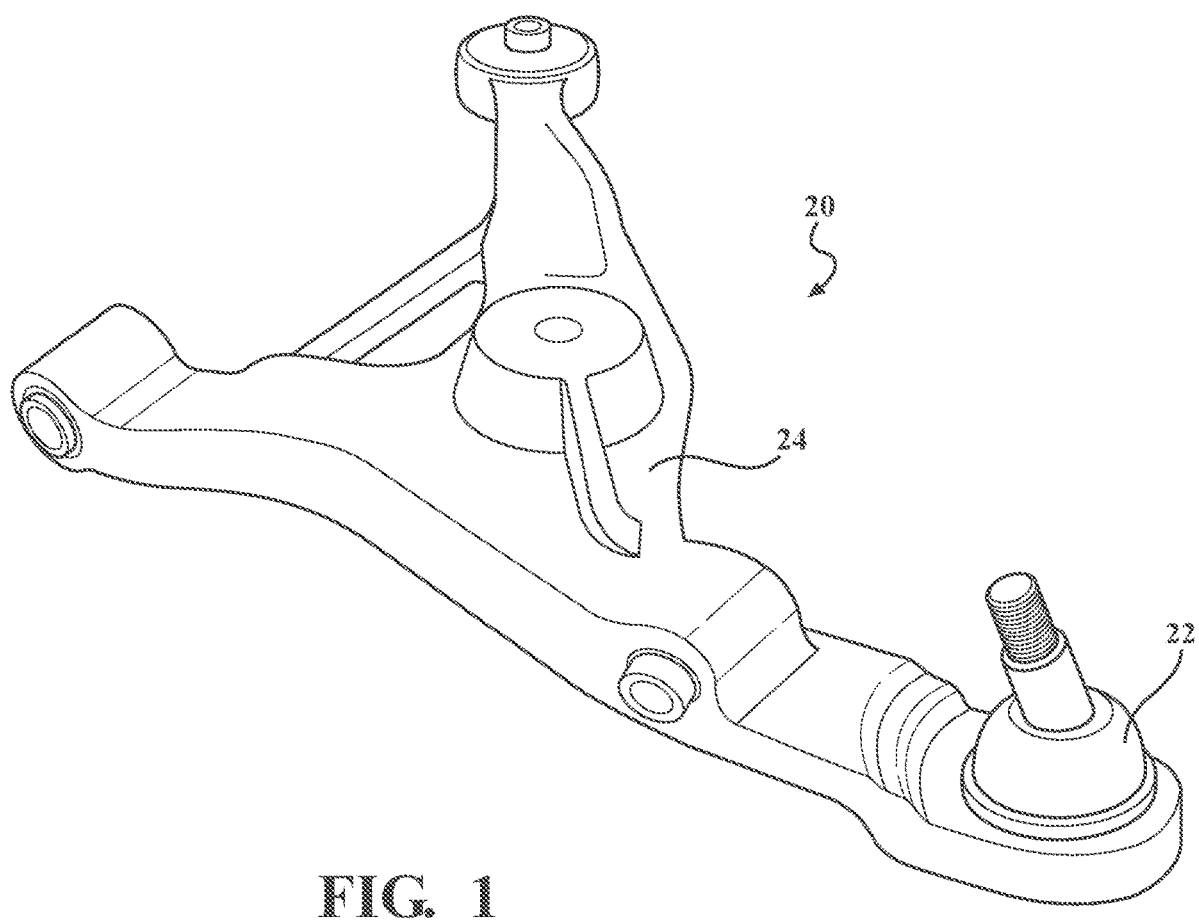
FIG. 1 is a perspective view of a control arm assembly which includes a ball socket assembly that is constructed according to a first embodiment of the present invention.

Referring to the Figures, wherein like numerals indicate corresponding parts throughout the several views, a control arm assembly 20 that includes a first exemplary embodiment of an improved ball socket assembly 22 is generally shown in FIG. 1. This embodiment is a tension loaded ball joint which is configured to join a control arm body 24 with a knuckle (not shown) in the front suspension assembly of a vehicle, but the ball socket assembly 22 could alternately be configured as a compression loaded ball joint or a ball joint with an axially neutral loading. Although shown in the exemplary embodiment as a component in a control arm assembly 20, it should be appreciated that the ball socket assembly 22 could find uses in other automotive applications (such as in tie rod ends) and in a range of non-automotive applications.

Figure 2:
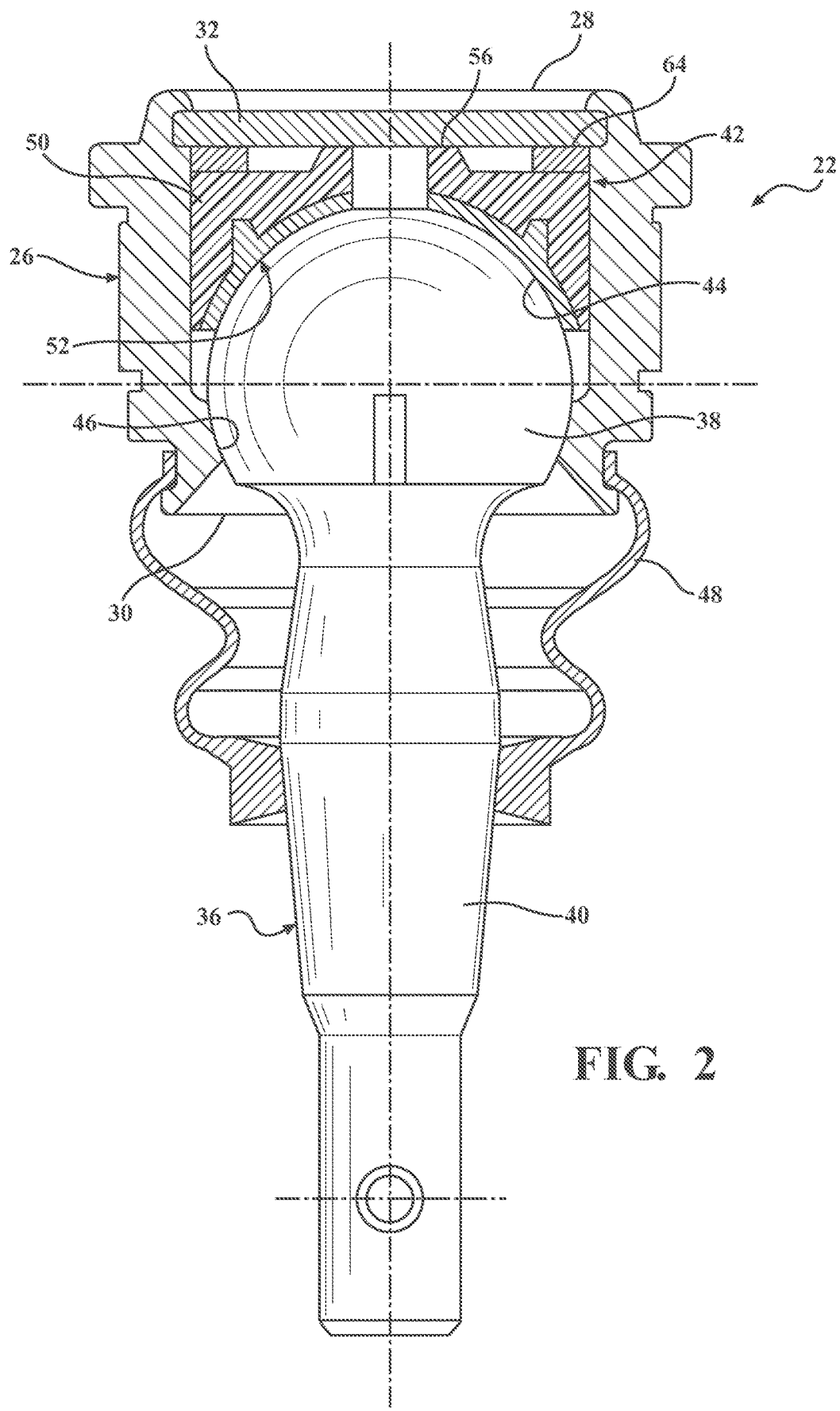
FIG. 2 is a partially cross-sectional view of the first embodiment of the ball socket assembly.
Figure 3:
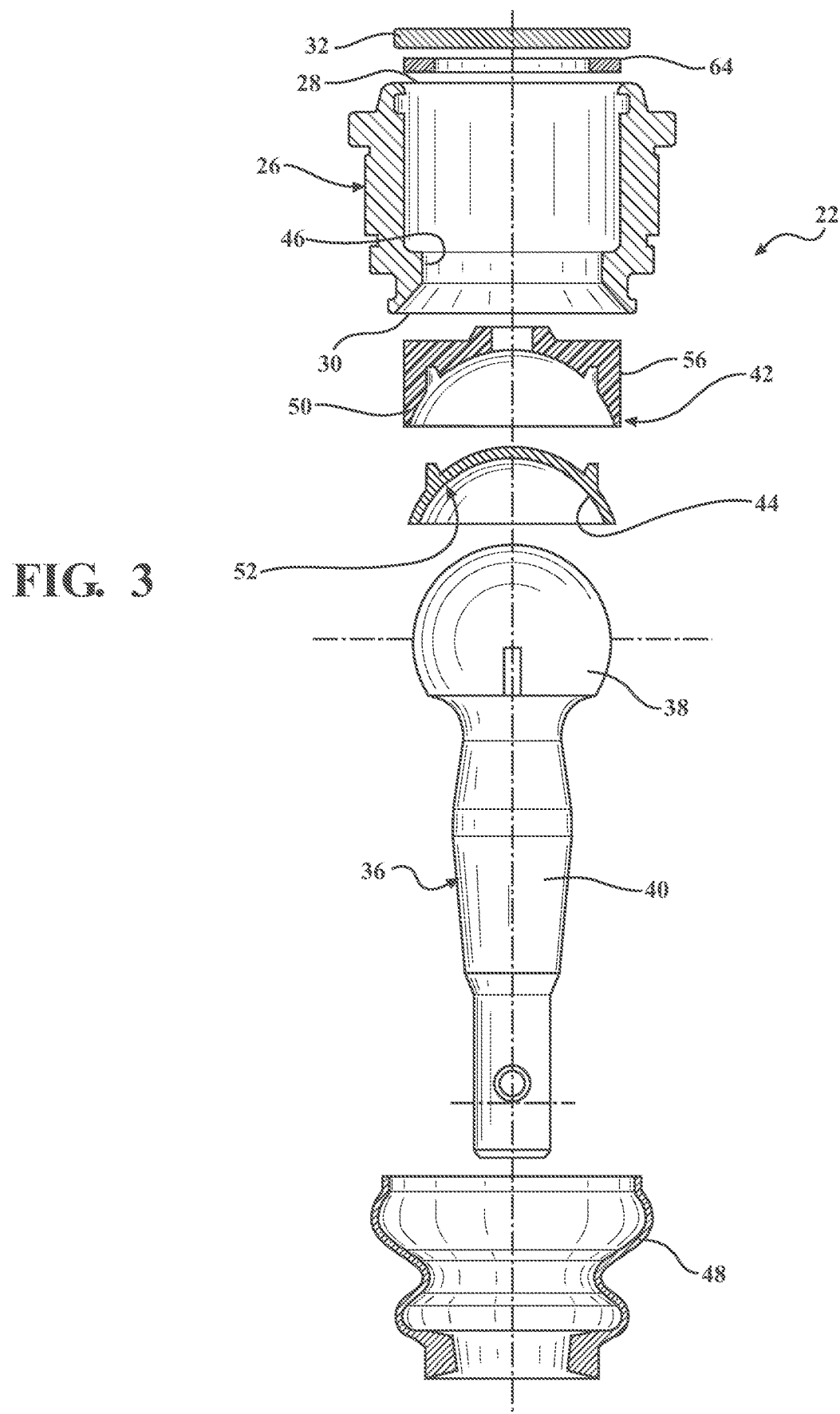
FIG. 3 is an exploded and partially cross-sectional view of the first embodiment of the ball socket assembly.

Referring now to FIGS. 2 and 3, the socket assembly includes a housing 26 which has an inner surface and an outer surface. The inner surface has an inner bore that extends along a central axis A from a first end 28 to an open second end 30. The inner bore is closed at the first end 28 by a cover plate 32. Although not shown, the cover plate 32 may have a lubricant opening which receives a grease fitting (also known as a Zerk fitting) for channeling a lubricant, such as grease, into the inner bore when the ball socket assembly 22 is manufactured and during routine maintenance. The housing 26 is preferably made as a monolithic piece of a metal, such as steel or an alloy steel, and may be shaped through any suitable process or combination of processes including, for example, forging, casting, machining from a billet, etc. In the exemplary embodiment, the housing 26 is a cartridge-style housing 26 in that it is configured to be inserted into an opening of a control arm body 24 (shown in FIG. 1). However, the housing 26 could alternately be made integral with another component, e.g., a tie rod end. In the exemplary embodiment, during manufacture of the ball socket assembly 22, the cover plate 32 is received in a counterbore of the first end 28 of the housing 26, and the housing 26 is swaged radially inwardly to capture the cover plate 32 and the other components discussed below within the inner bore.

The ball socket assembly 22 further includes a ball stud 36 with a ball portion 38 and a shank portion 40. The ball portion 38 is fully disposed in the inner bore of the housing 26, and the shank portion 40 projects out of the housing 26 through the open second end 30. The ball portion 38 has a generally semi-spherically curved outer surface which may have one or more lubricant grooves formed therein. The ball stud 36 may be made as a single, monolithic piece of metal, such as steel or an alloy steel and may be shaped through any suitable process or combination of processes, e.g., forging and machining.

In the exemplary embodiment, a backing bearing 42 is disposed in the inner bore of the housing 26 and is located axially between the ball portion 38 of the ball stud 36 and the cover plate 32, i.e., on the opposite side of the ball portion 38 from the shank portion 40. The backing bearing 42 has a first bearing surface 44 which is semi-spherically curved. The curvature of the first bearing surface 44 matches the curvature of the ball portion 38 so that the ball portion 38 can articulate and rotate relative to the backing bearing 42. In the exemplary embodiment, the first bearing surface 44 is in slidable contact with only a first hemisphere of the ball portion 38 of the ball stud 36. The inner surface of the housing 26 defines a second bearing surface 46 that is also semi-spherically curved and that is in slidable contact with only a second hemisphere (opposite of the first hemisphere) of the ball portion 38. Alternately, the second bearing surface 46 could be a part of an exit bearing (not shown) which is a separate piece from the housing 26. The first and second bearing surfaces 44, 46 are spaced axially from one another by an open gap at an equator of the ball portion 38 such that the first and second bearing surfaces 44, 46 only contact opposite hemispheres of the ball portion 38. Either or both of the first and second bearing surfaces 44, 46 may be provided with lubricant grooves to allow the lubricant to be distributed through an interior of the ball socket assembly 22 for lubricating the surface-to-surface contact between the ball portion 38 of the ball stud 36 and the first and second bearing surfaces 44, 46.

The ball socket assembly 22 further includes a dust boot 48 which seals the ball stud 36 and the housing 26 against one another to retain the lubricant within and to keep contaminants out of the interior of the ball socket assembly 22. The dust boot 48 extends from a first end 28, which is in a fluid-tight sealing relationship with the outer surface of the housing 26, to a second end 30, which is in a fluid-tight sealing relationship with the shank portion 40 of the ball stud 36.

Figure 4:
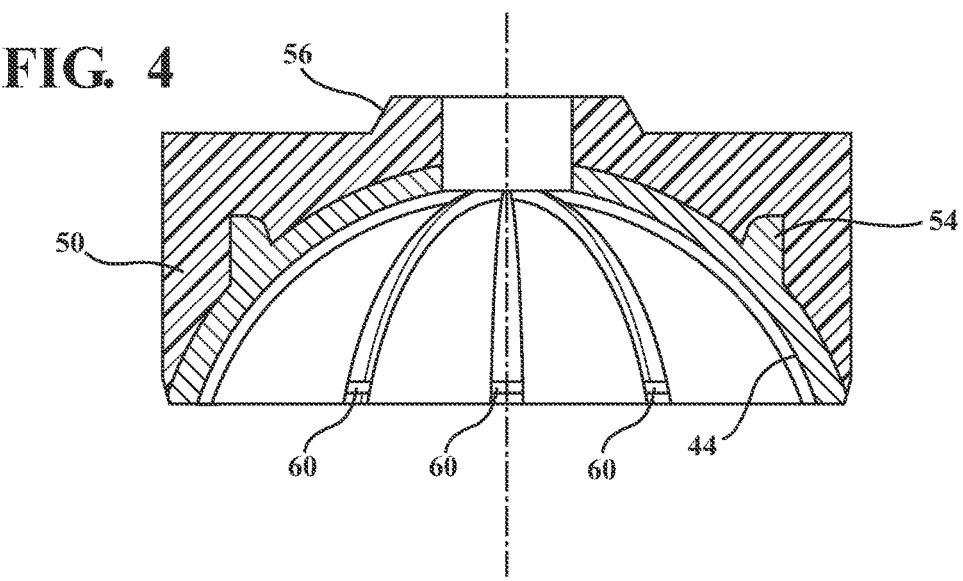
FIG. 4 is a cross-sectional view of a backing bearing of the ball socket assembly of FIGS. 2 and 3 wherein the backing bearing has integrally connected plastic and metal portions.
Figure 5:
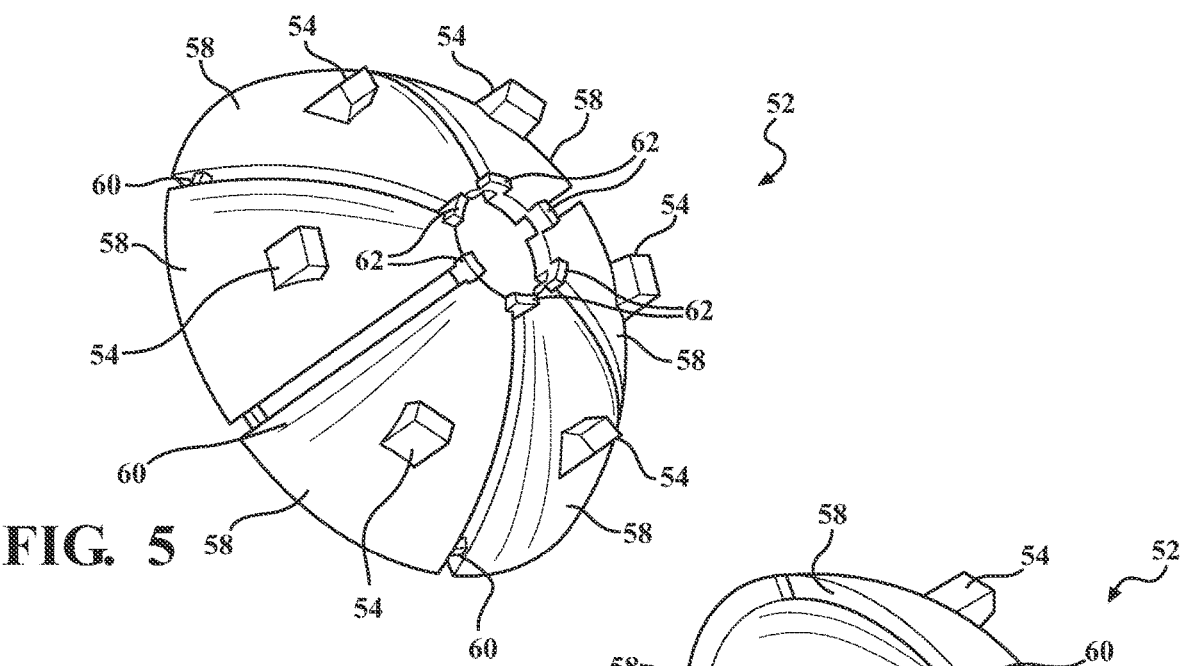
FIG. 5 is a perspective view of a metal portion of the backing bearing of FIG. 4.
Figure 6:
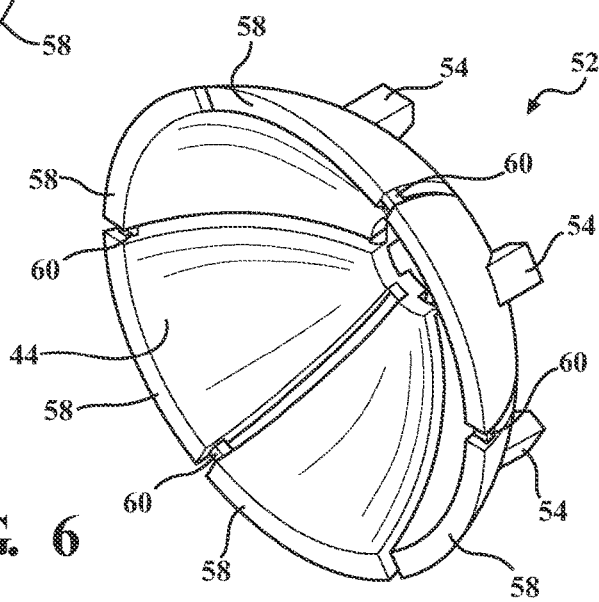
FIG. 6 is another perspective view of the metal portion of the backing bearing taken from a different view than FIG. 5.
Figure 7:
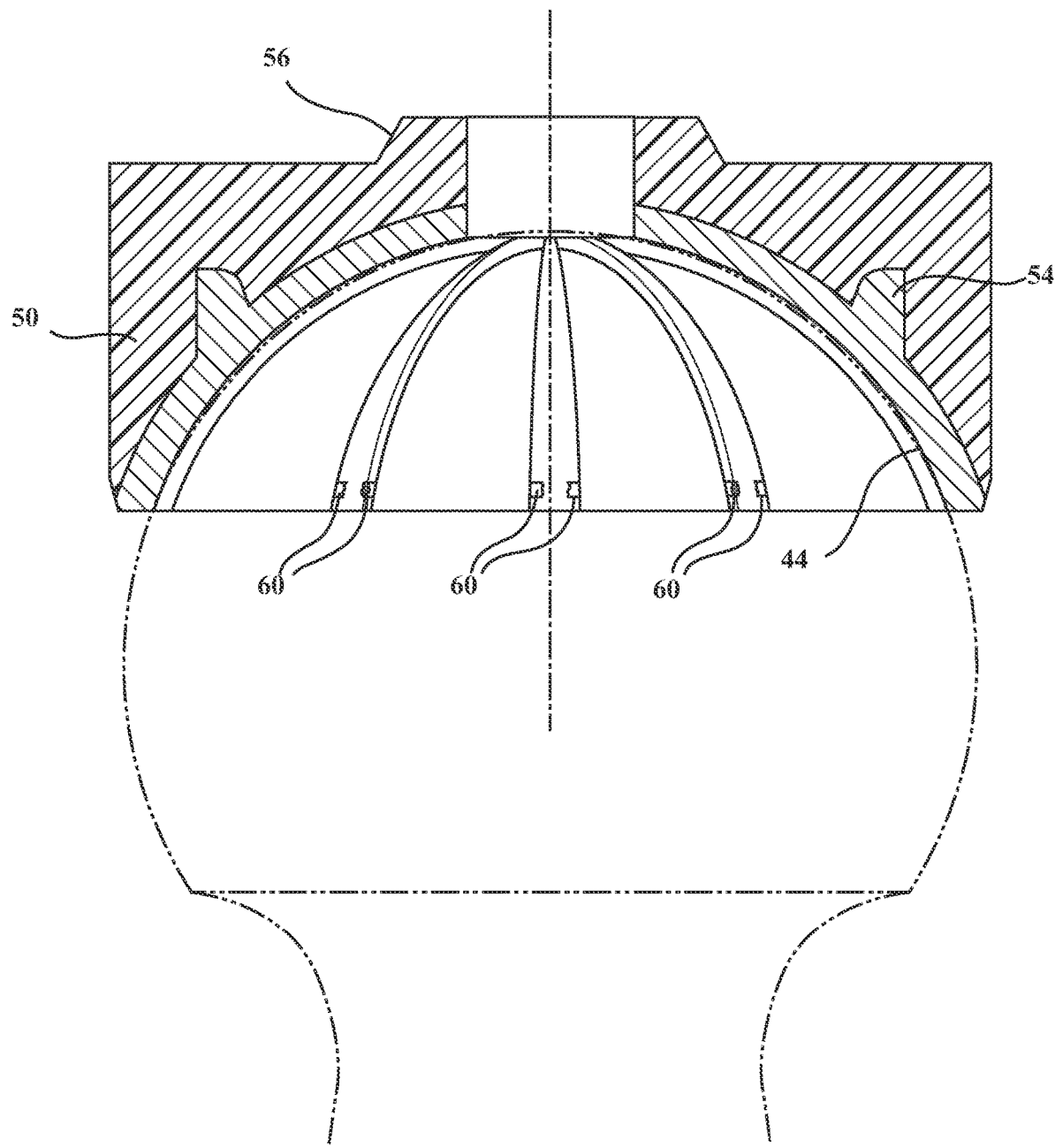
FIG. 7 is a cross-sectional view of a backing bearing as installed in a housing and showing a ball stud in phantom lines and illustrating the movement of a plurality of metal segments of the backing bearing upon breakage of a plurality of metal segments.

Referring additionally to FIGS. 4-6, the backing bearing 42 is a bearing assembly which includes a plastic portion 50 and a metal portion 52. The plastic portion 50 is overmolded onto the metal portion 52 to fixedly attach these components together before the backing bearing 42 is installed in the housing 26. In the exemplary embodiment, the metal portion 52 has a plurality of projections 54 which extend axially from a back surface of the metal portion 52 away from the first bearing surface 44 to improve the overmolding connection between the plastic and metal portions 50, 52. This allows the backing bearing 42 to be pre-assembled and inserted as a completed unit into the housing 26 during manufacture of the ball socket assembly 22.

In order to improve the durability and load bearing capacity of the ball socket assembly 22 by reducing wear, only the metal portion 52 defines the first bearing surface 44 which contacts the ball portion 38 of the ball stud 36, i.e., the plastic portion 50 has no contact with the ball portion 38. To improve the tolerance compliance of the ball socket assembly 22, the plastic portion 50 is made out of a polymeric material which has a greater elasticity than the metal of the metal portion 52, i.e., the material of the plastic portion 50 has a lower Young's modulus than the metal portion 52. The plastic portion 50 separates the metal portion 52 from the housing 26 in both a radial direction and an axial direction, such that the plastic portion 50 can flex resiliently to absorb energy as it transfers impact forces between the ball stud 36 and the housing 26 during operation of the ball socket assembly 22. As discussed in further detail below, the plastic portion 50 also allows the first bearing surface 44 of the metal portion 52 to better seat against the ball portion 38 of the ball stud 36. The polymeric material of the plastic portion 50 is preferably selected to provide the ball socket assembly 22 with desired mechanical properties, e.g., tensile strength modulus of elasticity, melting point, etc. For example, in the exemplary embodiment, the polymeric material of the plastic portion is Silicon, Nylon or Acetal (also known as Delrin). In the exemplary embodiment, the plastic portion 50 of the backing bearing 42 includes an annular protrusion 56 which protrudes in a direction away from the ball stud 36 and contacts the cover plate 32.

The metal portion 52 is divided into a plurality of segments 58 which are spaced circumferentially from one another, and the resiliency of the polymeric material of the plastic portion 50 allows the metal segments 58 to move relative to one another within the inner bore of the housing 26 during assembly of the ball socket assembly 22 and individually seat their respective portions of the first bearing surface 44 against the ball portion 38 of the ball stud 36. As compared to non-segmented backing bearings, this allows for an improved surface-to-surface contact and improved force distribution between the backing bearing 42 and the ball stud 36 due to imperfections between the curvatures of the ball portion 38 and the first bearing surface 44. The gaps between the segments 58 also allow for improved distribution of the lubricant within the interior of the ball socket assembly 22 to better lubricate the surface-to-surface contact between the ball portion 38 of the ball stud 36 and the first and second bearing surfaces 44, 46.

In the exemplary embodiment, the metal portion 52 of the backing bearing 42 is initially made as a single, monolithic piece, with the metal segments 58 being spaced from one another and interconnected via a plurality of connectors 60, 62 in the form of thin strips of metal. The connectors 60, 62 allow the metal portion 52 to be inserted into and held in place within an injection molding die (not shown) as a single piece during an injection molding operation to form the plastic portion 50 and fixedly attach the plastic portion 50 with the metal portion 52. As shown in FIGS. 5 and 6, in the exemplary embodiment, the metal portion 52 includes a plurality of first connectors 60 which interconnect the metal segments 58 at one axial end of the metal portion 52 and a plurality of second connectors 62 which interconnect the metal segments 58 at an opposite axial end of the metal portion 52. Thus, each metal segment 58 is integrally connected with both adjacent metal segments 58 at two locations. In the exemplary embodiment, the first connectors 60 may assist the projections 54 in securing the metal portion 52 of the backing bearing 42 with the plastic portion 50.

The connectors 60, 62 either could be designed to stretch or flex to allow the metal segments 58 to move relative to one another without the connectors 60, 62 breaking or they could be designed to break after the ball socket assembly 22 is manufactured and a load is applied thereto. In the case where the metal segments 58 are configured to flex, the metal portion 52 of the backing bearing 42 will remain monolithic after the ball socket assembly 22 is assembled. On the other hand, if the connectors 60, 62 are frangible and configured to break, after breakage, the metal portion 52 of the backing bearing 42 will no longer be monolithic. The metal portion 52 is preferably made out of steel or an alloy steel and is preferably made through a die casting and/or machining operation.

In the exemplary embodiment, a preload member 64 made out of an elastomeric material (such as rubber or a rubber-like material) is sandwiched between the backing bearing 42 and the cover plate 32. Alternately, the preload member could be a metal spring, such as a Belleville washer. When the ball socket assembly 22 is completed, the preload member 64 is compressed elastically to impart a biasing force on the backing bearing 42 to bias the first bearing surface 44 of the backing bearing 42 against the ball portion 38 of the ball stud 36. This improves the durability of the ball socket assembly 22 by maintaining surface-to-surface contact between the backing bearing 42 and the ball stud 36 as these components wear during the operating life of the ball socket assembly 22. In the exemplary embodiment, the preload member 64 is annular in shape and surrounds the protrusion 56 on the plastic portion 50 of the backing bearing 42 with an annular gap separating the protrusion 56 and the preload member 64. Alternately or additionally, the plastic portion 50 of the backing bearing 42 could itself function to preload the first bearing surface 44 against the ball portion 38 of the ball stud 36 without a separate preload member 64. The geometric shape and material of the plastic portion 50 may be specifically chosen to impart a desired preload force on the ball portion 38 of the ball stud 36.

Another aspect of the present invention is related to a method of making a ball socket assembly 22, such as the ball socket assembly 22 shown in FIGS. 2 and 3. The method includes the step of fixedly attaching the metal segments 58 with the plastic portion 50 to form the backing bearing 42. The method continues with the step of inserting the backing bearing 42 as a pre-assembled unit into the inner bore of the housing 26. Separate from the step of inserting the backing bearing 42 into the inner bore of the housing 26, the method includes the steps of inserting the ball portion 38 of the ball stud 36 into the housing 26 and establishing slidable contact between the ball portion 38 and the first bearing surface 44 of the backing bearing 42. In response to establishing slidable contact between the ball portion 38 of the ball stud 36 and the first bearing surface 44 of the backing bearing 42, the method continues with the step of moving at least one of the metal segments 58 relative to the other metal segments 58 to individually seat the at least one metal segment 58 against the ball portion 38 of the ball stud 36. Preferably, the method also includes the steps of inserting a preload member 64 into the inner bore of the housing 26 and elastically compressing the preload member 64.

The method may also include the step of breaking the connectors 60, 62 between the metal segments 58 to allow the metal segments 58 to move relative to one another or the step of stretching the connectors 60, 62 to allow the metal segments 58 to move relative to one another to individually seat against the ball portion 38 of the ball stud 36.

Obviously, many modifications and variations of the present invention are possible in light of the above teachings and may be practiced otherwise than as specifically described while within the scope of the appended claims. Additionally, it is to be understood that all features of all claims and all embodiments can be combined with each other as long as they do not contradict each other.

What is claimed is:

1. A ball socket assembly, comprising:
   a housing having an inner bore;
   a ball stud having a ball portion with opposing first and second hemispheres;
   a bearing assembly disposed in said inner bore of said housing and presenting a curved first bearing surface, said first bearing surface being in slidable contact with only said first hemisphere of said ball portion for allowing said ball stud and housing to rotate and articulate relative to one another;
   a curved second bearing surface presented on a different component from said bearing assembly and being in slidable contact with said second hemisphere of said ball portion;
   said bearing assembly including a plastic portion and a plurality of metal segments, said metal segments collectively defining said first bearing surface, said plurality of metal segments having a plurality of projections, said plastic portion being overmolded around said plurality of projections to fixedly attach said metal segments with said plastic portion, and said plastic portion allowing said metal segments to individually move relative to one another and seat against said ball portion of said ball stud; and
   a plurality of broken connectors between adjacent metal segments.

2. The ball socket assembly as set forth in claim 1 wherein said metal segments are not monolithically connected with one another.

3. The ball socket assembly as set forth in claim 1 wherein an inner surface of said housing defines said curved second bearing surface.

4. The ball socket assembly as set forth in claim 1 further including a preload member made of an elastically compressible material and being elastically compressed to bias said curved first bearing surface of said bearing assembly against said ball portion of said ball stud.

5. The ball socket assembly as set forth in claim 4 wherein said preload member is sandwiched between said plastic portion of said bearing assembly and a cover plate.

6. The ball socket assembly as set forth in claim 1 wherein said plurality of metal segments of said bearing assembly is further defined as four to eight metal segments.

7. A ball socket assembly, comprising:
   a housing having an inner bore;
   a ball stud having a ball portion;
   a bearing assembly including a plastic portion and a plurality of metal segments, said plurality of metal segments having a plurality of projections, said plastic portion being overmolded around said plurality of projections to fixedly attached said plurality of metal segments with said plastic portion, and said metal segments collectively defining a curved bearing surface that is in slidable contact with said ball portion to allow said ball stud and housing to rotate and articulate relative to one another; and
   said metal segments being spaced apart from one another, broken connectors located between said metal segments, and said plastic portion allowing said metal segments to move relative to one another and individually seat against said ball portion of said ball stud.

8. The ball socket assembly as set forth in claim 7 wherein said metal segments are not monolithically connected with one another.

9. The ball socket assembly as set forth in claim 7 wherein an inner surface of said housing defines a curved second bearing surface.

10. The ball socket assembly as set forth in claim 7 further including a preload member made of an elastically compressible material and being elastically compressed to bias said curved bearing surface of said bearing assembly against said ball portion of said ball stud.

11. The ball socket assembly as set forth in claim 10 wherein said preload member is sandwiched between said plastic portion of said bearing assembly and a cover plate.

12. The ball socket assembly as set forth in claim 7 wherein said plurality of metal segments of said bearing assembly is further defined as four to eight metal segments.

13. A method of making a ball socket assembly, comprising the steps of:
   overmolding a plastic portion around a plurality of projections formed onto a plurality of metal segments to fixedly attach the metal segments with the plastic portion to form a bearing assembly, said metal segments defining a curved bearing surface, and the metal segments being initially monolithic and interconnected with one another via a plurality of connectors;
   inserting said bearing assembly as a pre-assembled unit into an inner bore of a housing;
   separate from the step of inserting the bearing assembly into the inner bore of the housing, inserting a ball portion of a ball stud into the inner bore of the housing and establishing slidable contact between the ball portion and the curved bearing surface of the bearing assembly; and
   in response to establishing slidable contact between the ball portion of the ball stud and the curved bearing surface of the bearing assembly, breaking the connectors and moving at least one of the metal segments relative to the other metal segments to individually seat the at least one metal segment against the ball portion of the ball stud.

14. The method as set forth in claim 13 further including the step of inserting a preload member into the inner bore of the housing.

15. The method as set forth in claim 14 further including the step of elastically compressing the preload member.

* * * * *